United States Patent [19]

Matthews

[11] 4,325,681
[45] Apr. 20, 1982

[54] GEOTHERMAL IRRIGATION PUMP

[75] Inventor: Hugh B. Matthews, Worcester, Mass.

[73] Assignee: Sperry Corporation, New York, N.Y.

[21] Appl. No.: 130,952

[22] Filed: Mar. 17, 1980

[51] Int. Cl.³ .............................................. F03G 7/00
[52] U.S. Cl. .................................... 417/379; 60/641.4
[58] Field of Search ............ 417/379; 60/641.2, 641.3, 60/641.4, 641.6, 641.7

[56] References Cited

U.S. PATENT DOCUMENTS 3,274,769  9/1966  Reynolds ........................... 60/641.2
3,470,943  10/1969  Van Huisen ....................... 60/641.2
3,824,793  7/1974  Mathews ........................... 60/641.4
4,030,301  6/1977  Anderson ........................... 60/641.7

Primary Examiner—Allen M. Ostrager
Attorney, Agent, or Firm—Howard P. Terry; Richard J. McGrath

[57] ABSTRACT

A deep well pumping apparatus utilizing a geothermal source of energy is disposed within or above a stratum having a cool irrigating fluid, and an associated heat exchange unit is disposed within a stratum having the geothermal source. An organic working fluid is conveyed under pressure through the heat exchange unit and applied as a gas to a turbine assembly operatively coupled to the pump. The spent working fluid and cool irrigation fluid are then conveyed to the surface.

8 Claims, 4 Drawing Figures

GEOTHERMAL IRRIGATION PUMP

BACKGROUND OF THE INVENTION

1. Field of the Invention

The invention relates generally to efficient means for utilizing energy from subterranean geothermal sources and, more particularly, relates to novel arrangements including efficient deep well heat exchange and pumping equipment for pumping of underground water to the earth's surface.

2. Description of the Prior Art

A basic advance in the geothermal power extraction art was presented in the U.S. Pat. No. 3,824,793 issued to H. B. Matthews on July 23, 1974 for a "Geothermal System and Method", and the divisional application which resulted in the U.S. Pat. No. 3,898,020 of the same title issued Aug. 5, 1975, both of which were assigned to the Assignee of the instant invention. The aforementioned patents disclose geothermal energy recovery systems making use of thermal energy stored by subterranean heat sources in hot, solute bearing well water to generate a vapor from a surface injected flow of working fluid, for example, water; the vapor being used to operate a turbine driven pump within the well for pumping the hot geothermal fluid or brine at high pressure and always in liquid state to the earth's surface, where transfer of its heat energy in a binary closed loop heat exchanger is effected to vaporize a second fluid to drive a turbine-alternator combination for the generation of electrical power. The residual brine is pumped back into the earth, while the working fluid is regenerated at the surface and returned to the deep well pumping system for generating vapor and lubrication of fluid bearings supporting the turbine driven pump system.

An improvement in the basic Matthews concept appears in a more recently issued U.S. Pat. No. 4,142,108, issued Feb. 27, 1979 to H. B. Matthews for a "Geothermal Energy Conversion System". In this patent, the solute bearing hot well water is pumped upward to the earth's surface through an extended lineal heat exchange element for continuously heating a downward flowing organic working fluid. The temperature difference between the upward flowing brine and the downward flowing organic working fluid is maintained finite in a predetermined manner along the length of the subterranean extended heat exchange element wherein the working fluid is pressurized due to the gravity head as it flows down the lineal heat exchange element. After driving the deep well turbine driven pump, the hot organic fluid rises in a thermally insulated conduit for driving electrical power generation equipment, generally located at the earth's surface and after which it is then returned into the well for reheating as it travels downward in the extended heat exchanger.

Most irrigation water from deep wells is electrically pumped, and the cost of the electric power used for this purpose is an increasing problem, the energy cost of pumping being estimated to be several times the cost of all other energy uses combined on land so irrigated.

Accordingly, there is a need to provide a cost effective energy efficient means for pumping deep well irrigation water to the surface, especially in remote areas where electrical costs which may include the cost of installing electric lines to the area become prohibitive.

SUMMARY OF THE INVENTION

In accordance with the teachings of the present invention, a cost effective energy efficient method and apparatus for pumping deep well water is described.

Specifically, the apparatus of this invention is directed to geothermal pumping apparatus comprising conduit means for conveying a working fluid to a first level or stratum of a first fluid for heat exchange relation with said first fluid, wherein said working fluid is heated, motive means operatively coupled to said conduit means and responsive to said heated working fluid and pump means operatively coupled to said motive means and disposed within or above a second level or stratum of a second fluid for pumping the second fluid together with a small amount of the first fluid to a third level, i.e., generally the earth's surface.

More specifically, the preferred embodiment of this invention includes a first conduit extending deep within the earth passing through a stratum of underground irrigation water, having a generally undefined top water surface and a generally undefined bottom water surface. The first conduit, moreover, extends to a deeper level or stratum of underground water, generally a geothermal source of fluid at a generally elevated temperature above that of the irrigation water. Extending within the first conduit is a second conduit for conveying a working fluid therethrough into heat transfer relation with said source of geothermal fluid within the second level. The second conduit may include a plurality of tube bundles for efficiently transferring the geothermal energy of the second fluid to the working fluid. The second conduit is operatively coupled to a turbine motor responsive to the heated working fluid, which is heated in the heat exchange tube bundle and pressurized due to the head of fluid from above. The heated working fluid is then conveyed to the turbine motor which is operatively coupled to a pump disposed within the second level. The first conduit includes openings to allow the first source of fluid or the irrigation water to enter and fill the conduit within its level and associated openings to allow the hot geothermal fluid to fill the conduit within its level. The pump, operatively coupled to the turbine motor, pumps the first source of irrigation water and a small percentage of the heated geothermal fluid upwardly through the first conduit to the surface. An additional conduit is operatively coupled to the outlet of the turbine motor for conveying the spent working fluid upwardly to the surface wherein it is condensed partially within the additional conduit due to the cool irrigation fluid surrounding the additional conduit and completely condensed upon return to the surface by means of, for example, the pump irrigation water. The condensed working fluid may then be reinjected into the second conduit for heat exchange relation with said geothermal fluid.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENTS

For a more complete appreciation of the invention, attention is invited to the following description of the illustrative embodiments of the invention as shown in the attached drawings.

Figure 1A:
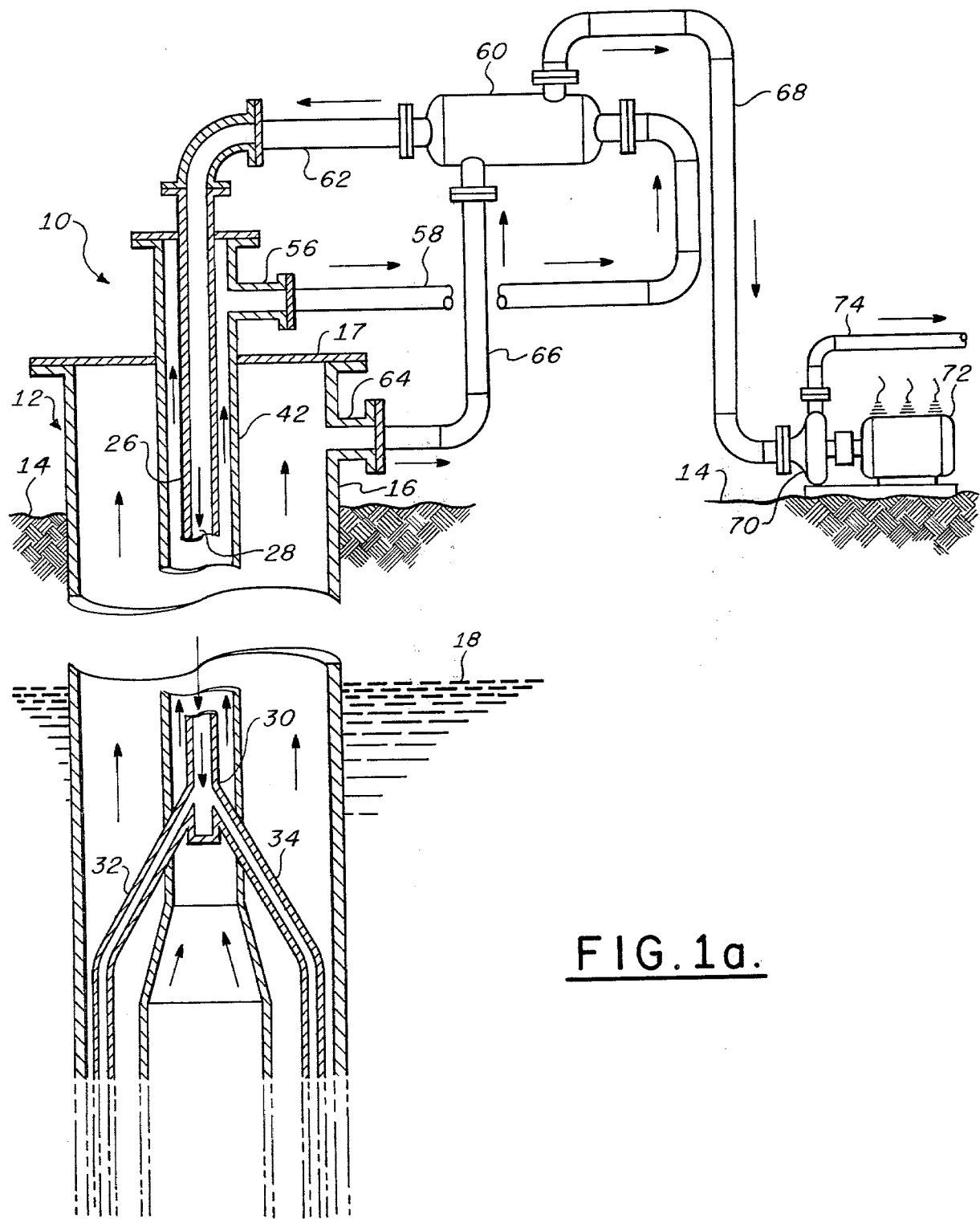
FIG. 1 is an elevation view, partly in cross section, of the novel geothermal system of the present invention.
Figure 1B:
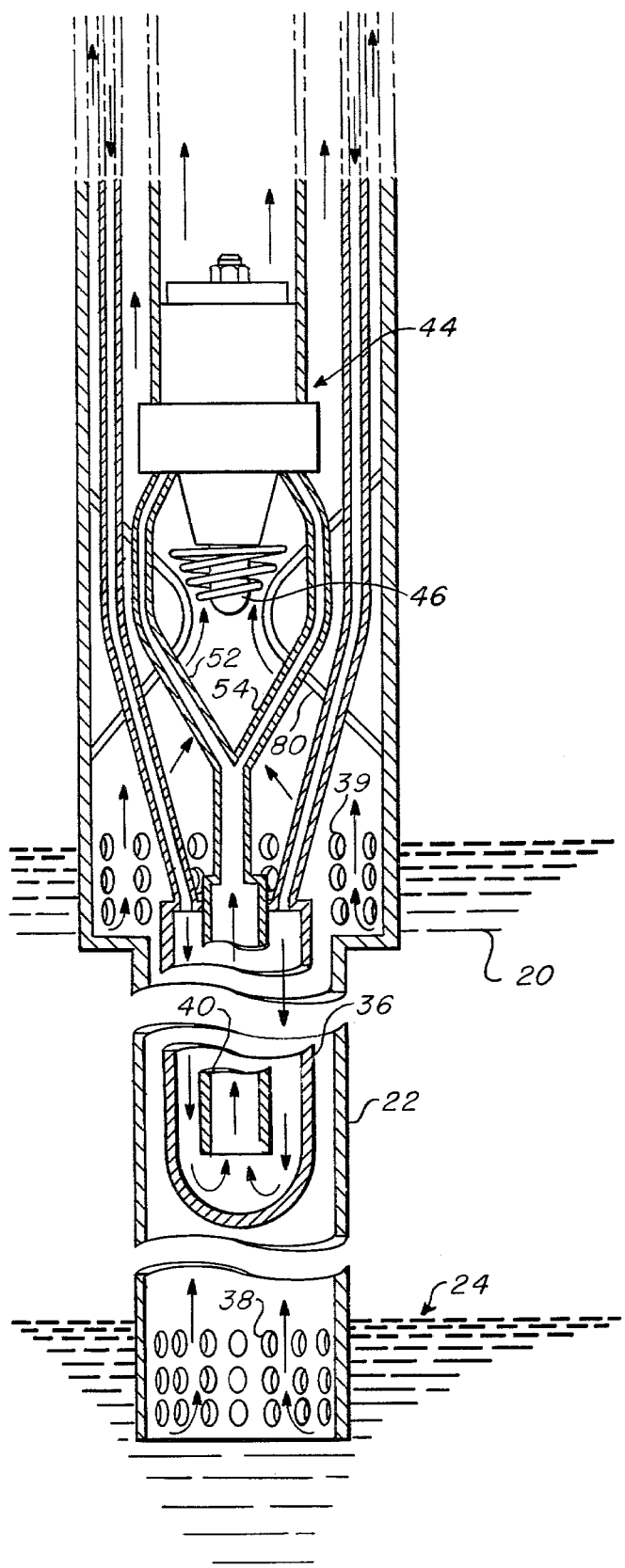

Referring to FIG. 1, in which it is shown that the preferred embodiment of the geothermal irrigation pumping system 10 of this invention, an active deep well pumping structure is shown having a well head section 12 located above the earth's surface 14 and extending downward. The apparatus includes well casing 16 extending downwardly from the surface capping or header plate 17 through a first level or stratum of fluid, the cool irrigation fluid, having a representative top surface level 18 below the earth's surface 14 and a lower bottom surface 20. The well casing 16 extends downwardly from the lower bottom surface and in the preferred embodiment is shown as a reduced diameter casing 22 which extends downwardly into the second fluid 24, the hot geothermal fluid at a second level or stratum substantially below the earth's surface.

The well casing 16 extends downward from the earth's surface 14 surrounding in generally concentric relation an inner conduit 42 and an innermost conduit 26 which supplies a flow in the sense of arrow 28 of an organic or working fluid. The innermost conduit 26 extends down within the casing 16 and branches at a tee 30 into a plurality of branching conduits 32 and 34 around the turbine pump of this invention wherein the branching conduits extend through the level of the irrigation water to a tube bundle or heat exchanger unit 36 extending into the reduced diameter casing 22. As the reduced diameter casing 22 includes openings 38 to allow the hot geothermal fluid to enter the casing the heat exchanger tube bundle 36 is immersed in a supply of hot geothermal fluid wherein the organic working fluid extending downwardly through the conduit 26 and branching conduits 32 and 34 is heated and returned from the heat exchanger tube bundle 36 via a return conduit 40 to the turbine pump unit 44 of this invention.

The inner conduit 42 permits an upward flow of the organic fluid leaving the turbine pump unit 44. The conduit 42 extends downwardly within the casing 16 to the turbine pump unit 44 disposed within the casing 16 in the first stratum of the cool irrigation fluid between the top surface 18 and the bottom surface 20 thereof. The turbine pump unit 44 includes a pump 46 operatively connected to a bearing supported turbine as described herein. The turbine pump unit 44 is coupled to the organic working fluid extension 40 via the pipes 52 and 54 which deliver hot pressurized organic fluid to the turbine pump unit 44 for operating the bearing supported turbine and pump 46. The spent organic fluid leaves the turbine pump unit 44 via conduit 42 and travels upwardly to the surface 14. The conduit 42 allows the heat exchange of the spent organic fluid with the cool rising irrigation water as pumped by the pump 46 such that the cool irrigation water partially condenses the organic fluid as it rises to the surface. At the surface, the annular conduit 42 branches at tee 56 into a vapor exhaust pipe 58 which is coupled to a condenser 60 from which the organic fluid is completely condensed and reinjected into the well via return pipe 62 coupled at the surface to the organic conduit 26. In like manner, the upward flowing irrigation water is shown in this preferred embodiment as being coupled to a tee 64 wherein the irrigation water is coupled via pipe 66 to the condenser to completely condense the organic fluid. Furthermore, in this embodiment of the invention, the irrigation water through the condenser 60 is coupled via a pipe 68 to a water turbine 70 coupled to a generator 72 to provide electrical energy as needed and the exhaust from the water turbine 70 is coupled via a pipe 74 for irrigation purposes, such as to irrigation sprinklers, not shown.

Figure 2:
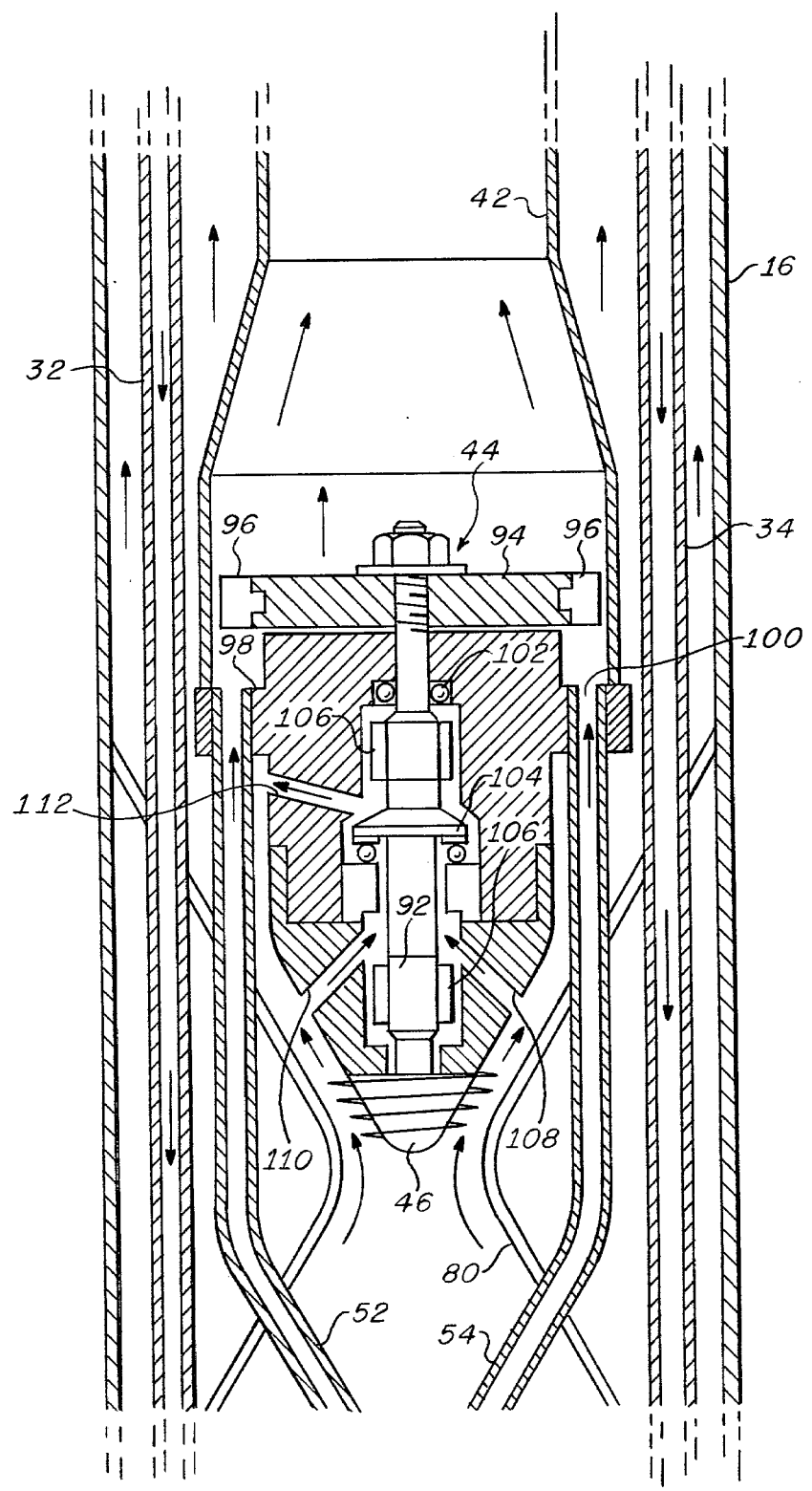
FIG. 2 is an elevation view, in section, of the turbine pump unit of this invention.

The turbine pump unit 44 is situated within the casing 16 and within a column of irrigation water as provided by the source of openings 39 in the case, the irrigation water filling the casing up to generally the top surface level represented by the numeral 18. The turbine pump unit is disposed in operative relationship with a pump shroud 80 forming an inlet to the pump 46 for efficient operation thereof during pumping of the irrigation water. Referring to FIG. 2, for a complete description of the turbine pump unit 44 of this invention, the turbine pump unit comprises a pump 46 disposed in operative relationship with the pump shroud 80 and coupled via a shaft 92 to a turbine 94. The turbine 94 and, specifically, the turbine blades 96 are disposed in operative relationship to the outlets 98, 100 of the heated organic fluid return pipes 52 and 54, respectively. The upward flowing heated organic fluid passes through the turbine blades 96 spinning the turbine and thereby driving the pump 46. The turbine pump unit is shown as having a shaft seal 102 and a plurality of hydraulic bearings, including a thrust bearing and pad assembly 104 for supporting the forces developed between the action of the turbine 94 and the pump 46, and radial bearing assemblies 106 as known in the art and shown schematically in the drawing. For lubrication purposes, the turbine pump unit 44 may include appropriate taps 108, 110 open to the irrigation water for allowing the water to enter the pump unit to lubricate the bearings 104 and 106, and an appropriate tapped opening 112 to permit the lubricating water in the unit 44 to exit into the rising flow of irrigation water.

Figure 3:
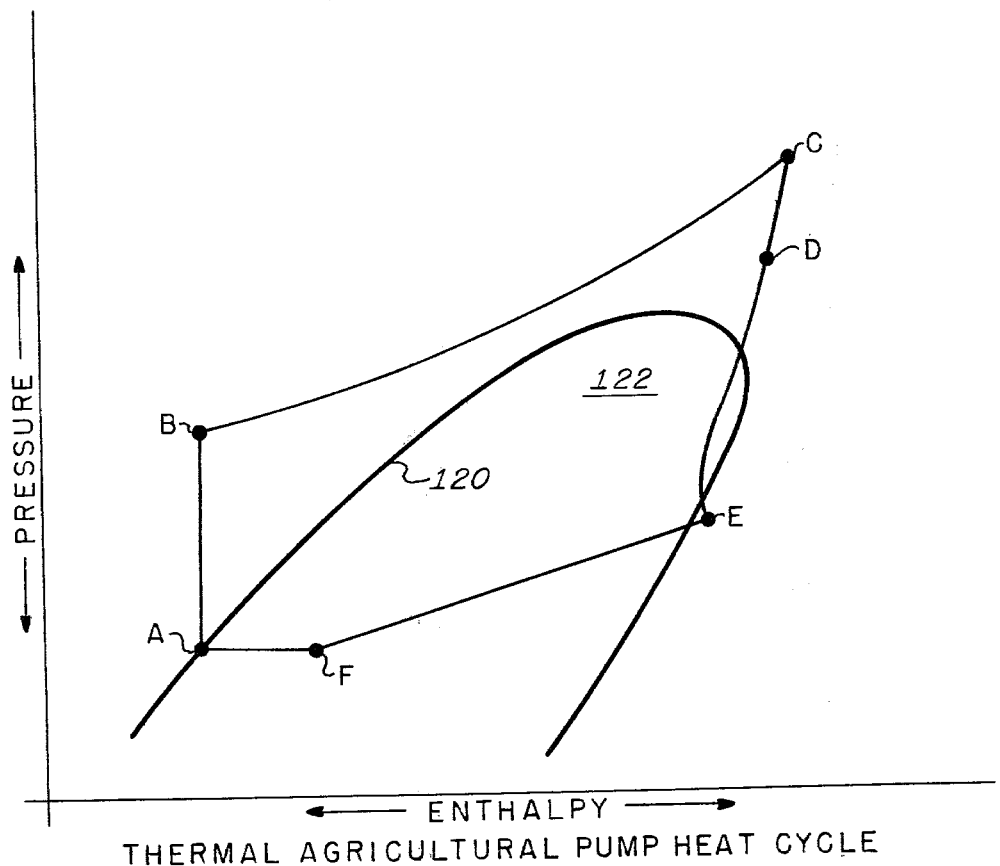
FIG. 3 is a pressure-enthalpy graph useful in explaining the operation of the present invention.

The operation of the geothermal irrigation pumping system of this invention may be discussed in connection with FIGS. 1, 2, and 3 wherein FIG. 3 is a pressure-enthalpy diagram of the working fluid of this invention as indicated by the loop A-B-C-D-E-F-A. The shape of the curve 120 is, of course, inherently defined or fixed by the physical nature of the particular organic fluid and defines the dual phase region 122 of the particular organic fluid. Accordingly, the relatively cold condensed organic fluid enters the well casing 16 via feed pipe 26, 62 as depicted in FIG. 1 and corresponding to a point indicated at point A in FIG. 3. The organic fluid descends through the aquifer of the cool irrigation fluid represented by surfaces 18 and 20 to the heat exchange unit 36 deep within the earth. As the organic fluid descends within the conduit 26, it is pressurized due to the head of fluid above it, the gravity head, and it is represented by the line A to B in FIG. 3 wherein the pressurization of the fluid occurs without any substantial heat exchange. When the organic fluid enters the heat exchange unit 36 and descends downwardly therein in heat exchange relation with the hot geothermal fluid at this particular stratum within the casing 22, the organic fluid is not only further pressurized by the gravity and heat, but it is also heated to vapor form within the heat exchanger tube bundle 36 as represented by the curve B-C, FIG. 3. It should be noted that the heat exchanger 36 is of sufficient length to provide sufficient heat to run the turbine pump unit 44 for pumping the irrigation water to the surface 14 at a sufficient pressure for delivery to the sprinklers. Once heated, the hot organic fluid then rises within the heat exchanger riser 40 through the branching pipes 52 and 54 to the turbine pump unit 44. This rise in elevation is represented in FIG. 3 by the pressure loss C to D which results from the work expended in rising from the heat exchanger 36 to the turbine pump unit 44. As the fluid rises it will lose some heat by transference into potential energy. Upon reaching the turbine pump unit 44, the vapor expands through the turbine blades 96 to drive the pump 46 for pumping the irrigation water to the surface. This expansion through the turbine 94 is represented by the curve D-E in FIG. 3 which may pass through the dual phase region 122 of the organic fluid. After expanding through the turbine 94, the organic fluid rises within the conduit 42 and is partially condensed therein by the upwardly pumped cool irrigation fluid in heat exchange relation therewith. The work expended in rising to the surface and the condensation in the conduit 42 are represented in FIG. 3 by the curve E to F. Upon reaching the surface 14, the organic fluid enters the condenser 60 where it is further cooled and condensed as represented by the curve F to A. The condensed fluid is then ready to be reinjected into the well via feed pipe 62.

The preferred embodiment described above and depicted in FIG. 1 wherein the pump apparatus is disposed between the upper fluid, i.e., the cool irrigating fluid, and the lower fluid, i.e., the geothermal source, is not to be considered a limitation of the present invention. Geological formations having a stratum containing a relatively hot geothermal source disposed above a stratum containing a relatively cool irrigation fluid might occur in some localities, and the present invention may be adapted to take advantage of these conditions. Such an adaptation, however, would require that the turbine pump unit 44 be situated in the cool irrigation fluid and that heat exchange unit 36 be situated above the turbine pump unit 44 in the geothermal source. The conduits conveying the irrigating fluid and the working fluid would also require appropriate modification, but these modifications would not affect the operative principles of the present invention.

Thus, while the invention has been described in its preferred embodiments, it is to be understood that the words which have been used are words of description rather than of limitation and that changes within the purview of the appended claims may be made without departure from the true scope and spirit of the invention in its broader aspects.

What is claimed is:

1. Apparatus for use in a well in order to pump a source of underground water to the earth's surface utilizing the thermal energy of a source of geothermal fluid, comprising:

first conduit means, disposed in said well, for conveying said underground water and a relatively small amount of said geothermal fluid to the earth's surface, second conduit means, disposed within said first conduit means, having a heat transfer section for pressurizing and for conveying a working fluid therethrough in heat transfer relation with said source of geothermal fluid, pump means disposed in said well and operatively coupled to said first conduit means for pumping the underground water and the relatively small amount of geothermal fluid to the earth's surface, motive means operatively coupled to said pump means and responsive to said heated and pressurized working fluid in said second conduit for driving said pump means, and means for condensing the working fluid exhausted from said motive means and for reinjecting the working fluid into said second conduit means.

2. Apparatus for pumping according to claim 1 wherein said second conduit means having a heat transfer section is disposed below said pump means.

3. Apparatus for pumping according to claim 1 wherein said motive means includes a turbine assembly supported by water lubricated bearings.

4. Apparatus for pumping according to claim 3 wherein said second conduit means having a heat transfer section includes a plurality of tubes.

5. Apparatus for pumping according to claim 4 wherein said first conduit means is coupled to means for irrigating land.

6. Apparatus for pumping according to claim 5 wherein said first conduit means is coupled to means for generating energy, by extracting hydraulic energy from the flow of the pumped water.

7. An apparatus according to claim 6 wherein said means for condensing the working fluid includes a condenser disposed adjacent to the earth's surface and responsive to the flow of underground water pumped to the earth's surface.

8. A method for pumping a source of underground water to the earth's surface utilizing a source of geothermal fluid which comprises:

conveying a working fluid through a heat transfer means responsive to said geothermal fluid, to heat and pressurize said working fluid;

transforming the internal energy of said heated working fluid into mechanical energy;

driving pump means with said mechanical energy; and conveying said underground water and a relatively small amount of said geothermal fluid to the surface with said pump means.

* * * * *